(12) United States Patent
Skaff et al.

(10) Patent No.: US 9,292,976 B2
(45) Date of Patent: Mar. 22, 2016

(54) EFFICIENCY GAUGE FOR PLUG-IN ELECTRIC VEHICLE

(71) Applicant: Ford Global Technologies, LLC, Dearborn, MI (US)

(72) Inventors: Ryan J. Skaff, Farmington Hills, MI (US); Henry F. Donald, III, Clarkston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/046,388

(22) Filed: Oct. 4, 2013

(65) Prior Publication Data

US 2015/0100226 A1   Apr. 9, 2015

(51) Int. Cl.
*B60W 50/14* (2012.01)
*G07C 5/00* (2006.01)
*B60W 40/12* (2012.01)
*B60W 50/00* (2006.01)

(52) U.S. Cl.
CPC .............. *G07C 5/004* (2013.01); *B60W 40/12* (2013.01); *B60W 50/14* (2013.01); *B60W 2050/0051* (2013.01); *B60W 2050/0089* (2013.01); *B60W 2050/146* (2013.01)

(58) Field of Classification Search
CPC ..................................................... B60W 50/14
See application file for complete search history.

(56) References Cited

U.S. PATENT DOCUMENTS

| D378,500 S | 3/1997 | Nakai et al. |
|---|---|---|
| 8,332,096 B2 | 12/2012 | Riegelman et al. |
| 8,406,948 B2 | 3/2013 | Wang et al. |
| 8,433,455 B2 * | 4/2013 | Siy .............................. B60L 1/02 701/1 |
| 2002/0171541 A1 * | 11/2002 | Crombez ............ B60R 16/0232 340/461 |
| 2012/0109408 A1 * | 5/2012 | Siy ............................. B60L 1/02 701/1 |
| 2013/0241485 A1 * | 9/2013 | Snyder ................ B60L 11/1809 320/109 |
| 2014/0049217 A1 * | 2/2014 | Nakagawa .......... B60L 11/1809 320/109 |
| 2014/0074329 A1 * | 3/2014 | Yang .................... B60L 11/1861 701/22 |

FOREIGN PATENT DOCUMENTS

| EP | 0548748 A1 | 6/1993 | |
|---|---|---|---|
| EP | 2759439 | * 2/2013 | ............ B60K 37/02 |
| WO | 20110163623 A1 | 12/2011 | |

* cited by examiner

*Primary Examiner* — Thomas G Black
*Assistant Examiner* — Ana Thomas
(74) *Attorney, Agent, or Firm* — David B. Kelley; Brooks Kushman P.C.

(57) ABSTRACT

A user interface for a vehicle may include an information display configured to display an efficiency gauge having an efficiency indicator. The position of the efficiency indicator may correspond to a range per full charge value. The range per full charge value may be calculated based on an amount of usable energy per full charge for an energy storage device and a distance-based energy consumption rate. An instantaneous energy consumption rate may be used to calculate an instantaneous range per full charge value. Similarly, an average energy consumption rate may be used to calculate an average range per full charge value. The efficiency gauge may include an instantaneous efficiency indicator corresponding to an instantaneous range per full charge value, an average efficiency indicator corresponding to an average range per full charge value, or both.

20 Claims, 3 Drawing Sheets

EFFICIENCY GAUGE FOR PLUG-IN ELECTRIC VEHICLE

TECHNICAL FIELD

The present disclosure relates to an apparatus, system and method for conveying energy consumption in a plug-in electric vehicle.

BACKGROUND

Plug-in electric vehicles, including battery electric vehicles (BEVs) and plug-in hybrid electric vehicles (PHEVs), may be connected to an external power supply for charging a vehicle battery. Such vehicles typically include a charge cord that extends from an external power supply to transfer energy by inductive methods or by physical connection to a vehicle charging port to facilitate charging of the vehicle battery. The vehicle battery provides electrical power to operate a motor, which generates wheel torque for propelling the vehicle. When the battery charge is depleted, the vehicle may no longer be mobile, particularly with respect to BEVs. Economical driving choices can help extend the vehicle's range, particularly by reducing the rate at which the vehicle expends energy stored in the battery.

Vehicles include a number of interfaces, such as gauges, indicators, and/or displays to convey information to the driver regarding the vehicle and its surroundings. With the advent of new technologies, these interfaces have become more sophisticated. For example, some vehicles include battery state of charge gauges and vehicle range indicators. Also, many electric vehicles incorporate efficiency or economy gauges that attempt to convey a rate at which the vehicle is expending energy stored in the battery. Typically, these gauges utilize metrics unfamiliar to many drivers. As a result, these drivers struggle to relate to the rate of energy consumption in a meaningful way for evaluating vehicle operating efficiency.

SUMMARY

One or more embodiments of the present disclosure relate to an information display system for a plug-in electric vehicle. The plug-in electric vehicle may include an electric motor operable to provide torque to propel the vehicle and an energy storage device configured to provide electrical energy to the electric motor. The information display system may comprise a controller configured to receive input indicative of an amount of usable energy per full charge of the energy storage device and at least one energy consumption rate. In certain embodiments, the energy consumption rate may be based on a distance. The controller may be further configured to calculate at least one range per full charge value based on the amount of usable energy per full charge and the at least one energy consumption rate. The at least one range per full charge value may also be distance-based. The information display system may further include an interface in communication with the controller. Moreover, the interface may be configured to display an efficiency gauge having at least one efficiency indicator on an information display. A position of the at least one efficiency indicator on the efficiency gauge may correspond to the at least one range per full charge value.

The at least one energy consumption rate may be an instantaneous energy consumption rate and the at least one range per full charge value may be an instantaneous range per full charge value. Additionally or alternatively, the at least one energy consumption rate may be an average energy consumption rate and the at least one range per full charge value may be an average range per full charge value. Further, the at least one efficiency indicator may include an instantaneous efficiency indicator corresponding to the instantaneous range per full charge value and an average efficiency indicator corresponding to the average range per full charge value.

The interface may be further configured to display an energy consumption history chart including a plurality of graphical elements collectively representing an elapsed interval. Each graphical element may be associated with a discrete sub-interval and indicative of an average range per full charge value over the discrete sub-interval. The elapsed interval may be a rolling interval. Moreover, the elapsed interval may be a time-based interval or a distance-based interval.

The energy consumption rate may be communicated in terms of distance per unit of energy consumed. Further, the range per full charge value may be calculated by at least multiplying the amount of usable energy per full charge by the energy consumption rate.

Alternatively, the energy consumption rate may be communicated in terms of energy consumed per unit of distance. Further, the range per full charge value may be calculated by at least dividing the amount of usable energy per full charge by the energy consumption rate.

One or more additional embodiments of the present disclosure relate to a control system for a vehicle comprising a controller and an interface in communication with the controller. The controller may be configured to receive input indicative of an energy consumption rate. The controller may be further configured to calculate a range per full charge value based on the energy consumption rate and an amount of usable energy per full charge of an energy storage device. The interface may be configured to display the range per full charge value.

The interface may include an information display configured to display an efficiency gauge having an efficiency indicator. Moreover, the efficiency indicator may correspond to the range per full charge value.

The energy consumption rate may be communicated in terms of distance per unit of energy consumed. Further, the range per full charge value may be calculated by at least multiplying the amount of usable energy per full charge by the energy consumption rate.

Alternatively, the energy consumption rate may be communicated in terms of energy consumed per unit of distance. Further, the range per full charge value may be calculated by at least dividing the amount of usable energy per full charge by the energy consumption rate.

Still one or more additional embodiments of the present disclosure relate to a method for displaying an efficiency metric. The method may include receiving, at a controller, input indicative of an energy consumption rate and calculating a distance per full charge value based on the energy consumption rate and an amount of usable energy per full charge of an energy storage device. The method may further include displaying the distance per full charge value on an information display.

Displaying the distance per full charge value on an information display may include displaying an efficiency gauge having an efficiency indicator. A position of the efficiency indicator on the efficiency gauge may correspond to the distance per full charge value.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

Figure 1:
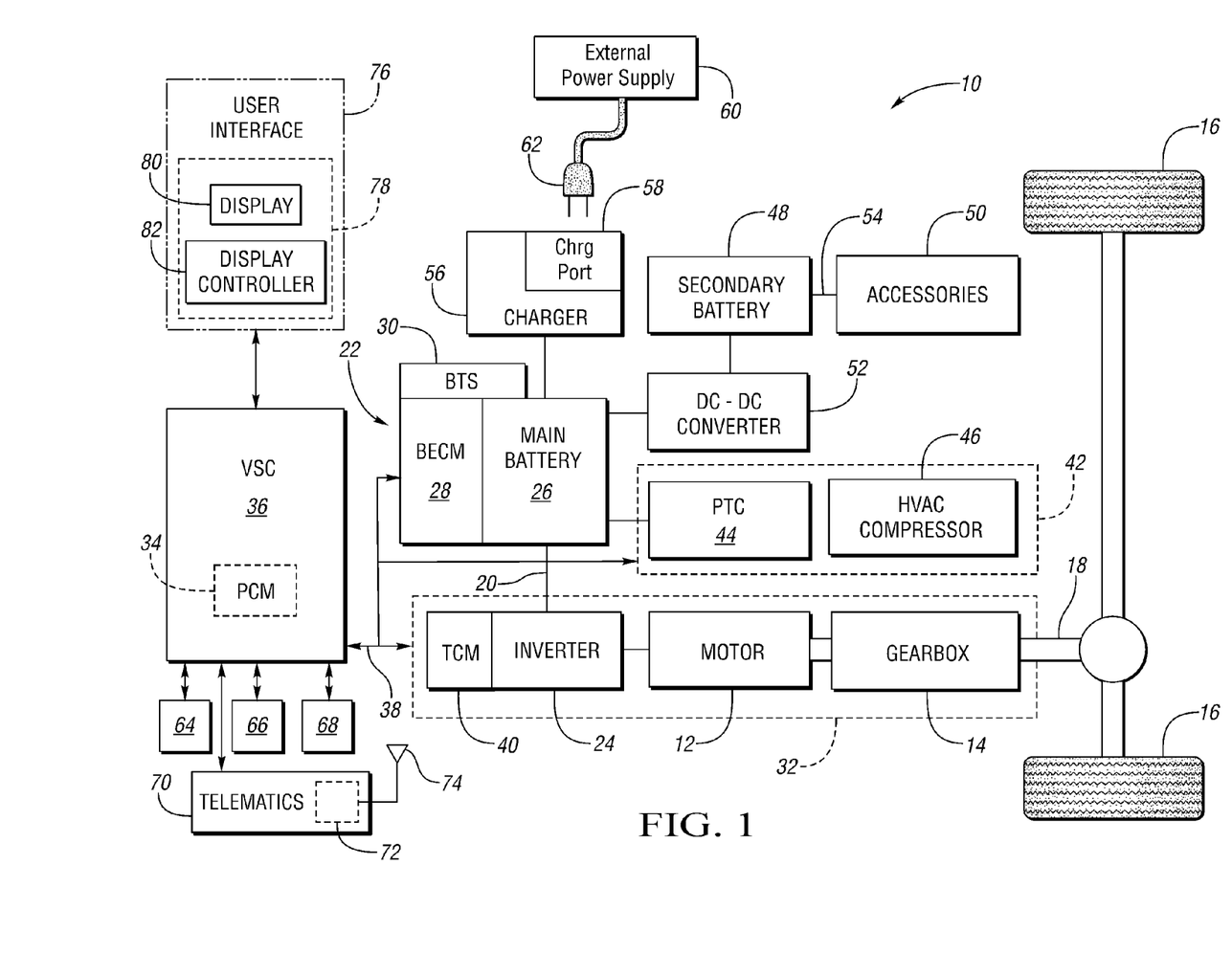
FIG. 1 is a simplified, exemplary schematic representation of a battery electric vehicle (BEV), in accordance with one or more embodiments of the present disclosure.

Referring now to the drawings, FIG. 1 is a simplified, exemplary schematic representation of a vehicle 10. FIG. 1 depicts the vehicle 10 as a battery electric vehicle (BEV), which is an all-electric vehicle propelled by one or more electric motors 12 without assistance from an internal combustion engine. The motor 12 may receive electrical power and provide mechanical rotational output power. The motor 12 may be mechanically connected to a gearbox 14 for adjusting the output torque and speed of the motor 12 by a predetermined gear ratio. The gearbox 14 may be connected to a set of drive wheels 16 by an output shaft 18. Other embodiments of the vehicle 10 may include multiple motors (not shown) for propelling the vehicle. The motor 12 may also function as a generator for converting mechanical power into electrical power. A high voltage bus 20 electrically connects the motor 12 to an energy storage system 22 through an inverter 24.

The energy storage system 22 may include a main battery 26 and a battery energy control module (BECM) 28. The main battery 26 may be a high voltage battery that is capable of outputting electrical power to operate the motor 12. According to one or more embodiments, the main battery 26 may be a battery pack made up of several battery modules. Each battery module may contain a plurality of battery cells. The battery cells may be air cooled using existing vehicle cabin air. The battery cells may also be heated or cooled using a battery thermal system 30, such as a fluid coolant system. The BECM 28 may act as a controller for the main battery 26 for monitoring and controlling various aspects of the battery operation. The BECM 28 may also include an electronic monitoring system that manages temperature and state of charge of each of the battery cells. Other embodiments of the vehicle 10 may utilize different types of energy storage systems, such as capacitors and fuel cells (not shown).

As shown in FIG. 1, the motor 12, the gearbox 14, and the inverter 24 may be collectively referred to as a transmission 32. To control various aspects of the electric powertrain, a powertrain controller 34 may be provided. As shown in FIG. 1, the powertrain controller 34 may be incorporated in another general vehicle controller, such as a vehicle system controller (VSC) 36. Alternatively, the powertrain controller 34 may be a dedicated controller for the electric powertrain. Although the powertrain controller 34 is shown as a single controller, it may include multiple controllers or may include multiple software components or modules embedded in a single controller. For example, the powertrain controller 34 could be a separate hardware device, or may include a separate powertrain control module (PCM), which could be software embedded within a general purpose controller, such as the VSC 36. Likewise, despite being shown as a single controller, the VSC 36 may include multiple controllers or may include multiple software components or modules embedded in a single controller to control various vehicle systems, subsystems and components. For instance, the VSC 36 may include any number of microprocessors, ASICs, ICs, memory (e.g., FLASH, ROM, RAM, EPROM and/or EEPROM) and software code to co-act with one another to perform a series of operations.

For the sake of simplicity, all monitoring, processing and control operations that may be performed by the powertrain controller 34 may be described herein as being carried out by the VSC 36, even though the powertrain controller 34 may be a separate, dedicated controller in communication with the VSC 36. To this end, the VSC 36 may communicate with other controllers (e.g., BECM 28) over a vehicle-wide network, referred to as a controller area network (CAN) 38. CAN 38 may be a hardline vehicle connection (e.g., bus) and may be implemented using any number of communication protocols.

Just as the main battery 26 includes a BECM, other devices controlled by the VSC 36 may include their own controllers, which may communicate with the VSC 36 through CAN 38. For example, the transmission 32 may include a transmission control module (TCM) 40, configured to monitor and coordinate control of specific components within the transmission 32, such as the motor 12 and/or the inverter 24. The TCM 40 may communicate with the VSC 36 over the CAN 38. The TCM 40 may include a motor controller for monitoring, among other things, the position, speed, power consumption and temperature of the motor 12. Using this information and a throttle command by the driver, the motor controller and the inverter 24 may convert the direct current (DC) voltage supply by the main battery 26 into signals that can be used to drive the motor 12.

Alternatively, the aforementioned controllers may be software control modules contained within the VSC 36 or other general purpose controllers residing on the vehicle 10. Some or all of these various controllers or software control modules can make up a control system in accordance with the present disclosure. It will be appreciated, however, that various aspects of the disclosed subject matter are not limited to any particular type or configuration of the VSC 36, or to any specific control logic for managing operation of the electric powertrain or other vehicle systems.

The vehicle 10 may also include a climate control system 42 for heating and cooling various vehicle components. The climate control system 42 may include a high voltage positive temperature coefficient (PTC) electric heater 44 and a high voltage, electric heating, ventilating and air conditioning (HVAC) compressor 46. The PTC 44 may be used to heat coolant that circulates to a passenger car heater. Heat from the PTC 44 may also be circulated to the main battery 26. Both the PTC 44 and the HVAC compressor 46 may draw electrical energy directly from the main battery 26. The climate control system 42 may include a controller (not shown) for communicating with the VSC 36 over the CAN 38. The on/off status of the climate control system 42 can be communicated to the VSC 36, and can be based on, for example, the status of an operator actuated switch, or the automatic control of the climate control system 42 based on related functions such as window defrost.

In addition to the main battery 26, the vehicle 10 may include a separate, secondary battery 48, such as a typical 12-volt battery. The secondary battery 48 may be used to power various vehicle accessories, headlights, and the like (collectively referred to herein as accessories 50). A DC-to-DC converter 52 may be electrically interposed between the main battery 26 and the secondary battery 48. The DC-to-DC converter 52 may adjust, or "step down" the voltage level to allow the main battery 26 to charge the secondary battery 48. A low voltage bus 54 may electrically connect the DC-to-DC converter 52 to the secondary battery 48 and the accessories 50.

The vehicle 10 may further include an alternating current (AC) charger 56 for charging the main battery 26. The AC charger 56 may be connected to a charging port 58 for receiving AC power from an external power supply 60 located at a charging station or other charging location (e.g., a home residence). The external power supply 60 may include an adapter 62 (e.g., a charging cable connector or a plug) for connecting to the charging port 58 at the vehicle's exterior. The external power supply 60 itself may be connected to an electrical power grid. Accordingly, the AC charger 56 may include power electronics used to convert, or "rectify" the AC power received from the external power supply 60 to DC power for charging the main battery 26. The AC charger 56 may be configured to accommodate one or more conventional voltage sources from the external power supply 60 (e.g., 110 volt, 220 volt, etc.). Although described above as being located at a fixed charging location, the external power supply 60 may be any external power source accessible by a vehicle operator for connecting to, or "plugging in" the vehicle 10 via the charging port 58. Accordingly, the external power supply 60 may be a portable power source.

Also shown in FIG. 1 are simplified schematic representations of a braking system 64, an acceleration system 66, a navigation system 68, and a telematics system 70. The braking system 64 may include a brake pedal, position sensors, pressure sensors, or some combination thereof, as well as a mechanical connection to the vehicle wheels, such as the primary drive wheels 16, to effect friction braking. The braking system 64 may also be configured for regenerative braking, wherein braking energy may be captured and stored as electrical energy in the main battery 26. The acceleration system 66 may include an accelerator pedal having one or more sensors, which, like the sensors in the braking system 64, may communicate information such as throttle input to the VSC 36.

The navigation system 68 may include a navigation display, a global positioning system (GPS) unit, a navigation controller and an interface for receiving destination information or other inputs from a driver. These components may be unique to the navigation system 68 or may be shared with other vehicle systems. For instance, the GPS unit may form at least part of the telematics system 70. The navigation system 68 may also communicate distance and/or location information associated with the vehicle 10, its target destinations, charge point locations, or other relevant GPS waypoints. The navigation system 68 may display map data in connection with a current vehicle location. The navigation system 68 may also calculate travel routes and provide corresponding route guidance to a driver based on the obtained destination information, charging station locations, and other points of interest (POIs). Moreover, the travel routes may be influenced by the amount of electrical energy remaining in the main battery 26, as will be described in greater detail below.

The telematics system 70 combines telecommunications and information processing. In particular, the telematics system 70 may enable communication between the vehicle 10 and one or more communication systems such as telephone systems and satellite systems. The telematics system 70 may include a number of transceivers 72 and antennas 74 for wirelessly communicating with one or more external satellite-based sources and/or terrestrial sources by way of radio transmissions, microwave transmissions, cellular networks, or the like. In addition to a GPS, the external sources may include traffic information systems, weather information systems, or remote assistance systems, to name a few. Accordingly, the telematics system 70 may exchange signals containing vehicle location and condition data, as well as relevant weather and traffic information based on the vehicle location data.

The VSC 36 may communicate with each individual vehicle system to monitor and control vehicle operation according to programmed algorithms and control logic. In this regard, the VSC 36 may help manage the different energy sources available and the mechanical power being delivered to the wheels 16 in order to maximize the vehicle's travel range.

The VSC 36 may include a programmable digital computer and suitable input/output circuitry or the like that is configured to receive the various input signals indicative of a condition of the vehicle system components. The input signals may be communicated from the vehicle system components themselves, or device-specific controllers, or may be received from various vehicle system sensors, antennas 74, or manual inputs. The VSC 36 may process these input signals and others according to logic rules to monitor and control operation of the electric powertrain. Although illustrated and described in the context of the vehicle 10, which is a BEV, it is understood that embodiments of the present disclosure may be implemented on other types of plug-in electric vehicles, such as a plug-in hybrid electric vehicle (PHEV).

In addition to the foregoing, the vehicle 10 may include a user interface 76 to facilitate communications with a driver. The user interface 76 may communicate with the VSC 36 and may convey relevant vehicle content to a driver of the vehicle 10. According to one or more embodiments of the present disclosure, the user interface 76 may include an information display system 78 for providing the interface between the driver and the various vehicle systems, such as the electric powertrain or telematics system 70. The information display system 78 may include an information display 80 electrically connected to a display controller 82. The display controller 82 may communicate with the powertrain controller 34, the BECM 28, the TCM 40 and other dedicated or general purpose controllers, such as the VSC 36. The display controller 82 may gather data from various vehicle systems and components such as the BECM 28, the TCM 40, the climate control system 42, vehicle accessories 50, and the like, which may be accessed via the CAN 38. Moreover, the display controller 82 may provide data to the information display 80 for conveying vehicle operation information to the driver in a meaningful manner. Signals output from the various vehicle systems and components may be processed, and display computations may be carried out, in the VSC 36, the display controller 82 or the information display 80, or some combination thereof.

Despite being shown as a separate controller, the display controller 82 may be integrated with the VSC 36 or another general or dedicated vehicle controller. Thus, as with the powertrain controller 34, all monitoring, processing and control operations that may be performed by a separate display controller may be described herein as being carried out by the VSC 36. Indeed, as used herein, any reference made to a controller in general may refer to the VSC 36, or may refer to another general or device-specific controller, such as the powertrain controller 34, the display controller 82, or any combination thereof.

The information display 80 may convey a host of information about the vehicle and its surroundings using graphical, schematic, numerical, textual and/or iconic representations or images. The display 80 may be disposed within a dashboard (not shown) of the vehicle 10, such as in an instrument panel or center console area. Moreover, the display 80 may be part of another user interface system, such as the navigation system 68, or may be part of a dedicated information display system. The display 80 may be a liquid crystal display (LCD), a plasma display, an organic light emitting display (OLED), or any other suitable display. The display 80 may include a touch screen for receiving driver input associated with selected areas of the display. The user interface 76 or display 80 may also include one or more buttons (not shown), such as hard keys or soft keys, for receiving driver input.

One or more embodiments of the present disclosure may be implemented using the user interface 76, in particular the information display system 78. The controller 36 may regularly receive vehicle data, including operational and environmental data, from communicatively connected devices, such as those described above. Moreover, the data may be processed into one or more representations relating to the operation of the vehicle 10 that may be displayed on the information display 80. Such display representations may include information on battery state of charge (SOC), vehicle range, rate of energy consumption, charge point locations, or the like.

Figure 2A:
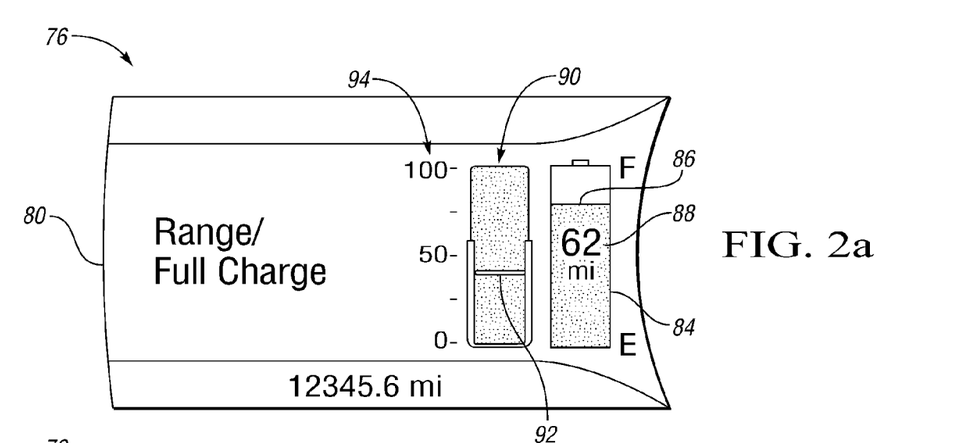
FIG. 2a depicts an exemplary information display for conveying an efficiency metric, in accordance with one or more embodiments of the present disclosure.
Figure 2B:
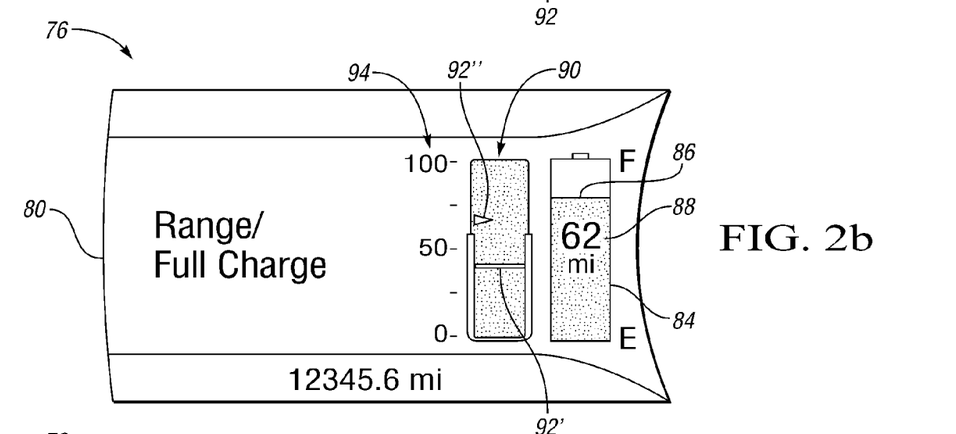
FIG. 2b depicts another exemplary information display for conveying an efficiency metric, in accordance with one or more embodiments of the present disclosure.
Figure 2C:
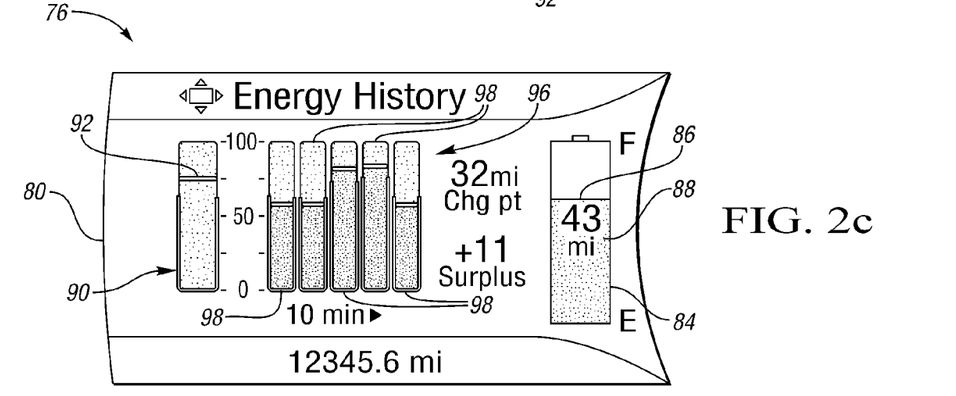
FIG. 2c depicts yet another exemplary information display for conveying an efficiency metric, in accordance with one or more embodiments of the present disclosure.

Referring generally to FIGS. 2a-c, for instance, the display 80 of the user interface 76 may include a battery gauge 84 having a battery SOC indicator 86. The battery SOC indicator 86 may convey the relative amount of electrical energy remaining in the main battery 26. BEVs have a limited range or distance that can be traveled before the main battery 26 is depleted of usable electrical energy. Accordingly, the range of a vehicle may also be referred to as its distance to empty (DTE) value. To convey the DTE value, the display 80 may also include a DTE indicator 88. As shown in FIGS. 2a-c, the DTE indicator 88 may be a digital data readout of the DTE value in units of distance (e.g., miles, kilometers, etc.) and may be located in the battery gauge 84. Alternatively, the DTE indicator 88 may be displayed in any suitable location on the user interface 76.

How the vehicle 10 is driven can be an important factor in determining how long the remaining charge in the main battery 26 will last. For instance, aggressive driving behavior may deplete the main battery 26 more rapidly than relatively conservative driving behavior. To this end, the operation of the vehicle 10 may be continuously monitored and analyzed in order to determine the impact of driving behavior on the vehicle's range. The controller 36 may take into account past driving behavior, current driving behavior, or predicted future driving behavior. Other factors can influence vehicle range as well, such as weather, terrain, electrical load from accessory usage, and the like.

To assist drivers in evaluating the impact of their driving behavior and other vehicle operating conditions, the display 80 may also include an efficiency gauge 90. Generally, the efficiency gauge 90 may convey a rate of energy consumption. The rate of energy consumption may be an instantaneous rate or an average rate of some predetermined interval. In plug-in electric vehicles, a typical efficiency gauge may convey a distance-based rate of energy consumption. For instance, the rate of energy consumption may be conveyed in terms of a distance per unit of energy consumed (e.g., miles/kWhr). Alternatively, the rate of energy consumption may be conveyed in terms of energy consumed per unit of distance (e.g., Whrs/mile).

Many drivers find it difficult to understand or relate to such energy consumption/economy metrics, largely because they are unfamiliar with energy units such as a Watt-hour. Rather, most drivers are familiar with and can relate to traditional fuel economy metrics found in conventional hybrid-electric vehicles or vehicles having an internal combustion engine only, such as a distance per volume of fuel (e.g., miles/gallon or MPG). In this vein, some efficiency gauges may convey a miles per gallon gasoline equivalent (MPGe) metric, which was introduced by the Environmental Protection Agency to compare energy consumption of alternative fuel vehicles (e.g., plug-in electric vehicles) with the fuel economy of conventional internal combustion vehicles. However, many drivers have trouble understanding the complexity of MPGe and, likewise, struggle relating to this consumption metric.

According to one or more embodiments of the present disclosure, the user interface 76 may be configured to display an efficiency gauge 90 having an efficiency indicator 92 for conveying an efficiency metric that drivers of plug-in electrical vehicles can connect to intuitively. In particular, the efficiency indicator 92 may convey a distance (electric vehicle range) per full charge value as the efficiency metric. The distance per full charge value may indicate a distance or range the vehicle 10 could travel on a full charge of the main battery 26, if operation of the vehicle is maintained at the current (or average) energy consumption rate. Accordingly, a distance per full charge value may also be referred to herein as a range per full charge value (RPFC).

To obtain the range per full charge value (RPFC), the amount of usable energy in the main battery 26 when it is fully charged must be known. On a full charge, the main battery 26 may have a known amount of usable energy. This amount of usable energy per full charge ($E_{FC}$) may refer to the amount of a battery's energy that can actually be utilized over the SOC range. Electric vehicle batteries may need to meet discharge and regenerative power requirements, as well as other requirements including life and safety. Accordingly, the amount of usable energy per full charge ($E_{FC}$) may be less than the nameplate capacity of the main battery 26. In certain embodiments, the amount of usable energy per full charge ($E_{FC}$) may be a fixed value. Alternatively, the amount of usable energy per full charge ($E_{FC}$) may change as the main battery 26 ages. Therefore, in one or more embodiments, the BECM 28 and/or the controller 36 may receive, calculate, look-up, or otherwise determine the amount of usable energy per full charge may change ($E_{FC}$) based on a number of factors, including cyclic life, depth of discharge, temperature, recharge rate, and the like.

The range per full charge value (RPFC) may be based on the amount of usable energy per full charge ($E_{FC}$) and an energy consumption rate ($R_E$), such as distance per unit of energy consumed (e.g., miles/kWhr) or energy consumed per unit of distance (e.g., Whrs/mile). For example, if the energy consumption rate ($R_E$) is being measured in terms of distance per unit of energy consumed, the range per full charge value (RPFC) may be calculated by multiplying the amount of usable energy per full charge ($E_{FC}$) by the energy consumption rate ($R_E$), as shown in Equation 1 below:

$$RPFC\left[\frac{miles}{Full\ Charge}\right] = E_{FC} * R_E \quad (Eq.\ 1)$$

$$= \left(\frac{kWhr}{Full\ Charge}\right) * \left(\frac{miles}{kWhr}\right)$$

Thus, if the amount of usable energy per full charge ($E_{FC}$) is 20 kWhr, then an energy consumption rate ($R_E$) of 4 miles/kWhr may be conveyed on the efficiency gauge 90 as 80 miles/full charge using the efficiency indicator 92.

Alternatively, if the energy consumption rate ($R_E$) is being measured in terms of energy consumed per unit of distance, the range per full charge value (RPFC) may be calculated by dividing the amount of usable energy per full charge ($E_{FC}$) by the energy consumption rate ($R_E$) (or multiplying the amount of usable energy by the inverse of the energy consumption rate), as shown in Equation 2 below:

$$RPFC\left[\frac{miles}{Full\ Charge}\right] = \frac{E_{FC}}{R_E} \quad (Eq.\ 2)$$

$$= \left(\frac{kWhr}{Full\ Charge}\right) * \left(\frac{1}{\frac{Whr}{mile}}\right) * \left(\frac{1000\ Whrs}{kWhr}\right)$$

Thus, if the amount of usable energy per full charge ($E_{FC}$) is 20 kWhr, then an energy consumption rate ($R_E$) of 250 Whr/mile may be conveyed on the efficiency gauge 90 as 80 miles/full charge using the efficiency indicator 92. The result is the same as the prior example since 250 Whr/mile is the inverse of 4 miles/kWhr.

As shown in FIG. 2a, the efficiency gauge 90 may be a bar gauge including a scale 94 of range per full charge values. The position of the efficiency indicator 92 on the efficiency gauge 90 may correspond to the calculated range per full charge value (RPFC). Accordingly, the range per full charge value (RPFC) may be conveyed based upon the location of the efficiency indicator 92 in relation to the scale 94. Though the exemplary efficiency gauge 90 is depicted in FIG. 2a as a vertical bar gauge, the range per full charge value (RPFC) may be conveyed in a number of different ways without departing from the scope of the present disclosure. For instance, the efficiency gauge 90 may be a horizontal bar gauge, a dial gauge, a meter gauge, or another suitable gauge type having an efficiency indicator 92 for conveying a range per full charge value (RPFC). Additionally or alternatively, the efficiency indicator 92 may be a digital numerical readout of the range per full charge value (RPFC).

The efficiency indicator 92 may be an instantaneous efficiency indicator corresponding to an instantaneous range per full charge value ($RPFC_{inst}$). In this manner, the instantaneous range per full charge value ($RPFC_{inst}$) may be based on an instantaneous energy consumption rate ($R_{E\_inst}$). Alternatively, the efficiency indicator 92 may be an average efficiency indicator corresponding to an average range per full charge value ($RPFC_{ave}$). The average range per full charge value ($RPFC_{ave}$) may be based on an average energy consumption rate ($R_{E\_ave}$). Further, the energy consumption rate may be averaged over some predetermined or preselected interval. The interval may be distance-based or time-based. For distance-based intervals, for example, the average energy consumption rate ($R_{E\_ave}$) used to calculate the average range per full charge value ($RPFC_{ave}$) may be based on a current trip distance, distance since the range per full charge value was last reset, long-term or lifetime mileage, or the like. For time-based intervals, the average energy consumption rate ($R_{E\_ave}$) used to calculate the average range per full charge value ($RPFC_{ave}$) may be based on predetermined period of time, such as the last 5, 10, or 30 minutes, or the like. As previously mentioned, the driver may be able to select between two or more particular range per full charge metrics or intervals for display.

The efficiency gauge 90 may include at least one efficiency indicator 92. The at least one efficiency indicator 92 may include an instantaneous efficiency indicator, an average efficiency indicator, or both. FIG. 2b illustrates an exemplary information display 80 including an efficiency gauge 90 having both an instantaneous efficiency indicator 92' corresponding to an instantaneous range per full charge value ($RPFC_{inst}$) and an average efficiency indicator 92" corresponding to an average range per full charge value ($RPFC_{ave}$).

Referring now to FIG. 2c, the user interface 76 may be further configured to display an energy consumption history chart 96. The energy consumption history chart 96 may include a plurality of graphical elements 98 that collectively represent an elapsed interval, while each graphical element 98 may be associated with a discrete sub-interval. Adjacent graphical elements may correspond to adjacent sub-intervals. The elapsed interval may be a distance-based interval with each discrete sub-interval corresponding to a fixed distance. Alternatively, the elapsed interval may be a time-based interval with each discrete sub-interval corresponding to a fixed period of time. The elapsed interval and/or the sub-intervals may be predetermined. According to one or more embodiments, one or more of the elapsed interval and the sub-intervals may be selectively varied by the driver via the user interface 76.

Each graphical element 98 may indicate a historical average range per full charge value ($RPFC_{ave}$) over the corresponding discrete sub-interval. As shown in FIG. 2c, the exemplary energy consumption history chart 96 may be a bar or column chart and each graphical element 98 may be a bar or column corresponding to a separate discrete sub-interval. Further, the height or length of each bar or column may indicate the average range per full charge value ($RPFC_{ave}$) for the corresponding time- or distance-based sub-interval. Moreover, the elapsed interval may be a rolling interval. In this manner, the energy consumption history chart 96 may convey average range per full charge values for each sub-interval beginning with the most recently completed sub-interval. Although a bar/column chart is illustrated, the energy consumption history chart 96 may be visually represented using other suitable charts, such as a line chart having discrete points indicating the average range per full charge value ($RPFC_{ave}$) for each sub-interval.

Figure 3:
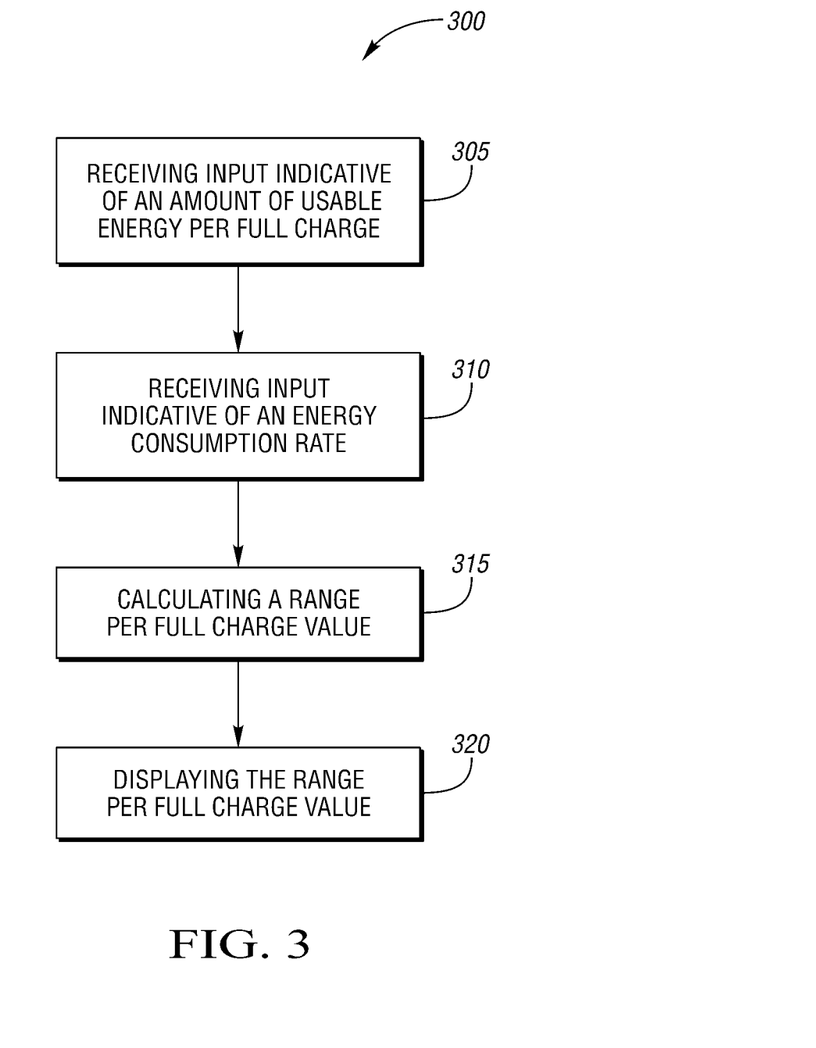
FIG. 3 is a simplified, exemplary flow diagram of a method for conveying an efficiency metric, in accordance with one or more embodiments of the present disclosure.

FIG. 3 is a simplified, exemplary flowchart of a method (300) for conveying an energy efficiency metric, in accordance with one or more embodiments of the present disclosure. Various steps in the method (300) may be carried out by the VSC 36, which may include the display controller 82. As seen therein, and with continuing reference to FIGS. 1-2c, the method (300) may include receiving (305) input indicative of an amount of usable energy per full charge ($E_{FC}$) of an energy storage device, such as the main battery 26. The method may further include receiving (310) input indicative of an energy consumption rate ($R_E$) and calculating (315) a range per full charge value (RPFC) based on the amount of usable energy per full charge ($E_{FC}$) and the energy consumption rate ($R_E$). As previously described, the energy consumption rate ($R_E$) may be communicated in terms of distance, such as distance per unit of energy consumed (e.g., miles/kWhr) or energy consumed per unit of distance (e.g., Whrs/mile). Further, the energy consumption rate ($R_E$) may be an instantaneous energy consumption rate ($R_{E\_inst}$) for calculating an instantaneous range per full charge value ($RPFC_{inst}$) or an average energy consumption rate ($R_{E\_ave}$) for calculating an average range per full charge value ($RPFC_{ave}$). The method (300) may also include displaying an efficiency gauge 90 having an efficiency indicator 92 on an information display 80. The position of the efficiency indicator 92 on the efficiency gauge 90 may correspond to the range per full charge value (RPFC).

Implementations of illustrative embodiments disclosed herein may be captured in programmed code stored on machine readable storage mediums, such as, but not limited to, computer disks, CDs, DVDs, hard disk drives, programmable memories, flash memories and other permanent or temporary memory sources. Execution of the programmed code may cause an executing processor to perform one or more of the methods described herein in an exemplary manner.

While exemplary embodiments are described above, it is not intended that these embodiments describe all possible forms of the invention. Rather, the words used in the specification are words of description rather than limitation, and it is understood that various changes may be made without departing from the spirit and scope of the subject matter presented herein. Additionally, the features of various implementing embodiments may be combined to form further embodiments of the present disclosure.

What is claimed is:

1. An information display system for a plug-in electric vehicle including an electric motor operable to provide torque to propel the vehicle and an energy storage device configured to provide electrical energy to the electric motor, the information display system comprising:
    a controller configured to:
        receive input indicative of an amount of usable energy per full charge of the energy storage device;
        receive input indicative of at least one energy consumption rate, wherein the at least one energy consumption rate is based on a distance;
        calculate at least one range per full charge value based on the amount of usable energy per full charge and the at least one energy consumption rate, wherein the at least one range per full charge value is distance-based; and
    an interface in communication with the controller and configured to display an efficiency gauge having at least one efficiency indicator on an information display, wherein a position of the at least one efficiency indicator on the efficiency gauge corresponds to the at least one range per full charge value even when the energy storage device is at less than full charge.

2. The information display system of claim 1, wherein the at least one energy consumption rate is an instantaneous energy consumption rate and the at least one range per full charge value is an instantaneous range per full charge value.

3. The information display system of claim 2, wherein the at least one energy consumption rate is an average energy consumption rate and the at least one range per full charge value is an average range per full charge value.

4. The information display system of claim 3, wherein the at least one efficiency indicator includes an instantaneous efficiency indicator corresponding to the instantaneous range per full charge value and an average efficiency indicator corresponding to the average range per full charge value.

5. The information display system of claim 1, wherein the interface is further configured to display an energy consumption history chart including a plurality of graphical elements collectively representing an elapsed interval, each graphical element associated with a discrete sub-interval and indicative of an average range per full charge value over the discrete sub-interval.

6. The information display system of claim 5, wherein the elapsed interval is a rolling interval.

7. The information display system of claim 6, wherein the elapsed interval is a time-based interval.

8. The information display system of claim 6, wherein the elapsed interval is a distance-based interval.

9. The information display system of claim 1, wherein the energy consumption rate is communicated in terms of distance per unit of energy consumed.

10. The information display system of claim 9, wherein the range per full charge value is calculated by at least multiplying the amount of usable energy per full charge by the energy consumption rate.

11. The information display system of claim 1, wherein the energy consumption rate is communicated in terms of energy consumed per unit of distance.

12. The information display system of claim 11, wherein the range per full charge value is calculated by at least dividing the amount of usable energy per full charge by the energy consumption rate.

13. A control system comprising:
    a controller configured to receive input indicative of an energy consumption rate and calculate a range per full charge value based on the energy consumption rate and an amount of usable energy per full charge of an energy storage device; and
    an interface in communication with the controller and configured to display the range per full charge value when the energy storage device is at less than full charge.

14. The control system of claim 13, wherein the interface includes an information display configured to display an efficiency gauge having an efficiency indicator, the efficiency indicator on the efficiency gauge corresponding to the range per full charge value.

15. The control system of claim 13, wherein the energy consumption rate is communicated in terms of distance per unit of energy consumed.

16. The control system of claim 15, wherein the range per full charge value is calculated by at least multiplying the amount of usable energy per full charge by the energy consumption rate.

17. The control system of claim 13, wherein the energy consumption rate is communicated in terms of energy consumed per unit of distance.

18. The control system of claim 17, wherein the range per full charge value is calculated by at least dividing the amount of usable energy per full charge by the energy consumption rate.

19. A method for displaying an efficiency metric comprising:
    receiving, at a controller, input indicative of an energy consumption rate;
    calculating a distance per full charge value based on the energy consumption rate and an amount of usable energy per full charge of an energy storage device; and
    displaying the distance per full charge value on an information display even when the energy storage device is at less than full charge.

20. The method of claim 19, wherein displaying the distance per full charge value on an information display comprises displaying an efficiency gauge having an efficiency indicator, wherein a position of the efficiency indicator on the efficiency gauge corresponds to the distance per full charge value.

* * * * *